United States Patent
Ruiters

(10) Patent No.: US 10,634,199 B2
(45) Date of Patent: Apr. 28, 2020

(54) METHOD FOR OPERATING A CLUTCH

(71) Applicant: GKN Automotive Ltd., Redditch, Worcestershire (GB)

(72) Inventor: Volker Rene Ruiters, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 144 days.

(21) Appl. No.: 15/758,003

(22) PCT Filed: Sep. 30, 2016

(86) PCT No.: PCT/EP2016/073387
§ 371 (c)(1),
(2) Date: Mar. 7, 2018

(87) PCT Pub. No.: WO2017/055524
PCT Pub. Date: Apr. 6, 2017

(65) Prior Publication Data
US 2018/0252276 A1    Sep. 6, 2018

(30) Foreign Application Priority Data

Sep. 30, 2015  (DE) .................. 10 2015 116 567

(51) Int. Cl.
*F16D 25/12*   (2006.01)
*F16D 48/06*   (2006.01)
*F16D 13/72*   (2006.01)

(52) U.S. Cl.
CPC ............ *F16D 48/06* (2013.01); *F16D 13/72* (2013.01); *F16D 25/123* (2013.01);
(Continued)

(58) Field of Classification Search
None
See application file for complete search history.

(56) References Cited

U.S. PATENT DOCUMENTS

| 8,983,746 B1* | 3/2015 | Song | F16D 48/06 701/22 |
| 2006/0194672 A1* | 8/2006 | Ochi | F16D 25/123 477/76 |

(Continued)

FOREIGN PATENT DOCUMENTS

| DE | 10155459 A1 | 5/2002 |
| EP | 1835194 A2 | 9/2007 |
| WO | 20050057151 A1 | 6/2005 |

OTHER PUBLICATIONS

International Search Report and Written Opinion for PCT/EP2016/073387 dated Jan. 5, 2017 (11 pages; with English translation).

*Primary Examiner* — Justin Holmes
(74) *Attorney, Agent, or Firm* — Bejin Bieneman PLC

(57) ABSTRACT

Operating a clutch assembly of a vehicle drive train, the clutch assembly comprising a clutch with a clutch component that exchanges heat at least indirectly with a medium which is conducted at least partially in the clutch, comprises at least: a) determining an operating point parameter which is representative of a current operating state of the clutch; b) determining a first thermal property parameter of the medium, as a function of the determined operating point parameter; c) determining a second thermal property parameter of the at least one clutch component; d) calculating a component temperature of the at least one clutch component as a function of at least the following three values: a further component temperature of a further clutch component, the first thermal property parameter, and the second thermal property parameter; and e) adapting activation of the clutch as a function of the calculated component temperature.

18 Claims, 2 Drawing Sheets

(52) U.S. Cl.
CPC ........... *F16D 2500/1045* (2013.01); *F16D 2500/3051* (2013.01); *F16D 2500/3056* (2013.01); *F16D 2500/30404* (2013.01); *F16D 2500/30405* (2013.01); *F16D 2500/30406* (2013.01); *F16D 2500/30415* (2013.01); *F16D 2500/30421* (2013.01); *F16D 2500/30426* (2013.01); *F16D 2500/502* (2013.01); *F16D 2500/7082* (2013.01)

(56) References Cited

U.S. PATENT DOCUMENTS

| | | | | |
|---|---|---|---|---|
| 2011/0257838 | A1* | 10/2011 | Olsson | F16D 48/06 701/33.4 |
| 2012/0290249 | A1* | 11/2012 | Hebbale | F16D 48/06 702/130 |
| 2016/0138664 | A1* | 5/2016 | Lee | F16D 48/00 701/67 |

* cited by examiner

METHOD FOR OPERATING A CLUTCH

CROSS-REFERENCE TO RELATED APPLICATIONS

This application is a national stage of, and claims priority to, Patent Cooperation Treaty Application No. PCT/EP2016/073387, filed on Sep. 30, 2016, which application claims priority to German Application No. DE 10 2015 116 567.8, filed on Sep. 30, 2015, which applications are each hereby incorporated herein by reference in their entireties.

BACKGROUND

A clutch assembly generally comprises at least one clutch and at least one activation unit for activating the clutch. The clutch usually comprises a housing, at least one sump, at least one disk carrier and a multiplicity of clutch disks which run in the housing in a (cooling) medium, in particular oil. In this context, the clutch disks at least indirectly exchange heat with the medium. The clutch is heated decisively by the frictional power which is input into the clutch and which is generated on the basis of differences in rotational speed of disks which rotate relative to one another and rub against one another. This heat must be discharged again from the clutch, wherein the medium is mounted at least partially in the sump, fed to the clutch disks and then fed again to the sump (cooling circuit).

The transmitted torque of such a disk clutch is very dependent on the temperature or the heating of the disks. Owing to the stringent requirements which are made of the positional accuracy of a disk clutch, this temperature influence must be taken into account during the operation of the disk clutch. For example an electronic control unit which is assigned to the clutch can be configured and determined to detect this temperature influence and compensate it virtually completely. However, in order to be able to compensate this influence correspondingly, the disk temperature which is present in the clutch must be known as precisely as possible.

Since the direct integration of temperature sensors in the disk pack is too costly and susceptible to faults, the disk temperature could be estimated by means of corresponding temperature models which run in the electronic unit. For this purpose, static temperature models are required which are based on sensory detection or direct measurement of the temperature of the medium.

Such static temperature models are, however, too imprecise to take into account the dynamic influences of operating-point-dependent cooling. Since the flow of the medium through the clutch usually depends on the operating point of the clutch, an operating-point-specific cooling behavior of the clutch disks, which cannot be described by means of known static temperature models, is produced. In addition, the sensory measurement of the temperature of the medium is very costly and susceptible to faults, wherein measurement of the temperature directly in the region of the clutch disks, such as would be necessary for the sensory detection of operating-point-dependent cooling, is also impossible to implement with acceptable expenditure in terms of sensors.

SUMMARY

The present disclosure relates to operating a clutch assembly of a motor vehicle. A disclosed method can be used, in particular, in a clutch assembly which comprises a clutch for the variable distribution of torque to different drive parts of a motor vehicle.

Disclosed herein is a method for operating a clutch assembly that permits the operating-point-specific cooling behavior of the clutch disks to be taken into account. In addition, the method allows for the temperature of the (cooling) medium which is currently present in the region of the clutch disks to be determined without being reliant for this purpose on a temperature sensor for measuring the temperature of the (cooling) medium.

The present disclosure includes a method according to the features of claim 1. Further advantageous embodiments of the method are specified in the dependent claims. It is to be noted that the features which are disclosed individually in the dependent claims can be combined with one another in any desired technologically appropriate way and define further embodiments. Furthermore, the features which are specified in the claims are described in more detail and explained below, with further embodiments being presented.

A method for operating a clutch assembly of a drive train of a vehicle, wherein the clutch assembly has at least one clutch with at least one clutch component which exchanges heat at least indirectly with a medium which is conducted at least partially in the clutch, comprises at least the following iteratively occurring steps (i.e., iteratively or cyclically running through these steps):

a) determining at least one operating point parameter which is representative of a current operating state of the clutch, b) determining at least one thermal property parameter which is assigned to the medium, as a function of the determined operating point parameter, c) determining at least one thermal property parameter which is assigned to the at least one clutch component, d) calculating at least one component temperature of the at least one clutch component as a function of at least the following three values:
  at least one further component temperature of a further clutch component,
  the thermal property parameter, determined in step b), of the medium,
  the thermal property parameter, determined in step c), of the at least one clutch component, e) adapting activation of the clutch as a function of the calculated component temperature.

In this way, a novel temperature model for (operating-point-dependent) determination of a temperature of a clutch component (component temperature) is presented. The series of method steps a) to e) occurs during a regular sequence of the method. Since the method occurs iteratively (i.e., cycles through the steps), the precise sequence (or order) of the method steps is, however, not significant. Individual method steps can also be carried out simultaneously or in parallel. Reference data of the corresponding values can be used to initialize the method. Temperature reference data can be initialized, for example, by means of a measured ambient temperature and/or by means of a sump temperature and/or control unit temperature measured (only for initialization purposes).

The clutch can be a disk clutch.

The medium serves to exchange heat with at least one component of the clutch assembly, in particular (i.e. to a prominent degree) for discharging heat. The medium is, in particular, a fluid, e.g., oil. Insofar as explanations below refer to oil, they can equally well be transferred to other suitable heat exchange media, unless stated otherwise.

The clutch component whose component temperature is calculated in step d) can be a clutch disk or a disk pack of the clutch. The clutch component can alternatively or additionally be a disk carrier, an (oil) sump and/or a clutch housing of the clutch. The method can also be applied for a plurality of these specified clutch components, in order to determine their respective component temperatures. Then, in particular, step d) takes place repeatedly, and once per clutch component under consideration (per iteration step). The step d) can be carried out, for example, as step d.1) for a first clutch component, as step d.2) for a second clutch component and so on for a plurality of clutch components. A plurality (two, three or even more) of the calculated component temperatures can be used in step e) in order to carry out the activation of the clutch as a function of the plurality of component temperatures.

The method proposed here is based on the idea that continuously calculating and taking into account operating-point-dependent thermal property parameters, in particular of the medium, can lead to a situation in which the current component temperature in a coupling component of a coupling assembly can be calculated precisely without having to rely for this on a temperature sensor to actually measure the component temperature and the temperature of the medium.

The method takes into account not only the "static" (component-predefined) thermal property parameters such as, e.g., the thermal capacitances of the coupling component (that is to say, for example, of the clutch disks, of the disk carrier, of the sump and/or of the clutch housing), and the exchange of heat between these coupling components and the environment, but also includes a "variable" or "dynamic" portion which takes into account, for example, the operating-point-specific wetting of the clutch component/components with the medium. This can be described according to the proposed method by means of a variable thermal capacitance and/or a variable volume flow of the medium.

Within the scope of the method, at least one disk temperature and/or at least one disk carrier temperature (e.g. internal disk carrier and external disk carrier separately) can be calculated as component temperatures.

According to step a), firstly at least one operating point parameter is determined which is representative of a current operating state of the clutch. "Representative" means in this context that the operating point parameter is suitable or intended for permitting a conclusion to be drawn about the current operating state of the clutch.

Such an operating point parameter can be the temperature of the medium or the temperature of the sump because the medium (e.g., oil) has a correspondingly different viscosity at different temperatures. The viscosity of the medium acts directly on the degree of wetting of the clutch components with the medium. For example, the medium temperature or the sump temperature of a preceding iteration step can be used as an operating point parameter for the subsequent iteration step. Since always at least the temperature of the medium, and depending on the embodiment also the sump temperature, are calculated by means of the method and not measured, at the start the operating point parameter can be initialized, for example by means of a surrounding temperature, a sump temperature which is measured (only for the initialization), a starting temperature which is stored in a memory, or the like.

In steps b) and c) property parameters of the medium and at least one coupling component can subsequently be determined, wherein, in particular, the operating point parameter is also taken into account. At this point, the method is dynamic, and can react flexibly to changing boundary conditions or cross-influences. The property parameters can change as a function of the operating point parameter.

In step d) the two property parameters which have been determined in steps b) and c) can be taken into account in order to determine a component temperature. This component temperature can be a temperature of the components whose property parameter has been determined previously in step c). The calculation takes place in step d) on the basis of a component temperature of a further clutch component. This further clutch component is, in particular, a clutch component other than the clutch component whose component temperature is to be calculated in step d) and whose property parameter has been determined in step c). The calculation is carried out, in particular, in that, on the basis of the property parameter of the clutch component and the property parameter of the medium, a differential temperature, by which the temperature of the clutch component which is to be calculated differs from the temperature of the further clutch component is calculated starting from the component temperature of the further clutch component. The corresponding formula is:

$$T_K = T_{WK} + \Delta T(E_K, E_M, T_{WK})$$

Here, $T_K$ is the component temperature which is to be calculated, $T_{WK}$ is the temperature of the further clutch component, $E_K$ is the property parameter of the clutch component and $E_M$ is the property parameter of the medium. The differential temperature $\Delta T$ can therefore additionally also depend on the temperature of the further clutch component.

According to step e) activation of the clutch is adapted as a function of the calculated component temperature. The term "activation" is understood here to mean the predefinition of a coupling pressure, of a contact pressure force of the clutch disks, of a frictional power or the like. For the activation or predefinition of these values, the clutch assembly can comprise at least one (externally) controllable activation unit which can be configured and determined to activate and/or deactivate or increase or reduce the transmission of torque. The activation unit can have at least one hydraulic actuation device, in particular a hydraulic actuator, and/or at least one electronic actuation device, in particular an electronic servomotor. In this context, the actuation travel and/or the actuation force can be adapted, specifically, reduced or increased, as a function of the calculated component temperature.

The transmitted torque of a (disk) clutch is dependent on the temperature or the heating of the clutch component/components, in particular the clutch disks, for which reason this temperature influence is taken into account during the operation of the clutch. The adaptation of the activation of the clutch, as a function of the calculated component temperature, in particular of the disk temperature, makes it possible to comply with the stringent requirements made of the actuation accuracy of the clutch. The adaptation can be carried out here in such a way that the temperature influence is virtually completely compensated. The temperature influence can be compensated, for example, by virtue of the fact that a coupling pressure, a contact pressure force of the clutch disks (normal force), a frictional power or the like is changed, in particular decreased or increased, if a temperature-dependent coefficient of friction of the clutch component changes, in particular increases or decreases, as a function of the calculated component temperature. The temperature-dependent coefficient of friction can be stored in and retrieved from corresponding tables.

Alternatively or additionally, the frictional power of the clutch is reduced if the calculated component temperature, in particular the disk temperature, exceeds a predefined threshold value. In this context, in a chronologically preceding step, the calculated disk temperature can be compared with a permissible threshold value. The threshold value is generally predefined below a limiting value for the maximum permissible disk temperature. However, the distance between the threshold value and the limiting value can be adapted to the current operating state of the clutch. The reduction in the frictional power can be brought about by decreasing the rotational speed difference and/or the transmitted torque, e.g., by reducing the coupling pressure or the contact pressure force acting on the disk pack.

According to one advantageous embodiment it is possible that the following additional step D) occurs before step e):

D) calculating at least one temperature of the medium as a function of at least the following two values:
at least one component temperature of a clutch component, and
of the thermal property parameter, determined in step b), of the medium.

The temperature of the medium which is calculated (in an operating-point-specific fashion) is the temperature of the medium which is at the current operating point in the clutch, in particular in the region of the clutch disks or in the clutch pack.

The step D) can occur between the steps c) and d) or between the steps d) and e). The method occurs iteratively (or cyclically), but does not depend on the precise sequencing of the method steps. The calculation in step D) can occur additionally as a function of the thermal property parameter determined in step c) of the at least one clutch component and/or as a function of at least one further component temperature of a further clutch component.

If step D) occurs in the method, the calculation of the at least one component temperature in step d) can additionally take place as a function of the temperature of the medium calculated in step D). The formula can be as follows, wherein $T_M$ represents the temperature of the medium:

$$T_K = T_{WK} + \Delta T(E_K, E_M, T_{WK}, T_M)$$

Of course, $T_K$ and $T_M$ can also be interchanged here. Then, step D) takes place after step d), and the formula could be as follows:

$$T_M = T_{WK} + \Delta T(E_K, E_M, T_{WK}, T_K)$$

The temperature of the medium can be calculated as a function of the component temperatures of the disk temperature and the disk carrier temperature. Furthermore, the temperature of the medium can also be calculated as a function of the sump temperature.

In particular, the calculation of the temperature of the medium of the medium which is currently located in the clutch in step D) makes it possible to dispense with a temperature sensor in the clutch for determining the temperature of the medium and nevertheless makes possible a very precise calculation of a component temperature of a clutch component. This applies, in particular, to a disk temperature of a clutch disk as a clutch component.

In addition, the method takes into account not only the cooling of the clutch disks by the medium (which flows along). Furthermore, the method also takes into account the heat transfer processes from the clutch disks to other components, in particular to the sump and/or the disk carrier or carriers. In addition, the method also permits heating of the clutch disks by the medium and/or the other components to be taken into account, e.g. in critical or unusual operating states of the clutch. Such heating can occur if the feed device for feeding the medium becomes hot and/or a plurality of clutches, in particular ones which are connected one behind the other, are supplied by means of a common clutch sump. If the sump is located fluidically between two of these plurality of clutches, the medium which is heated by the first clutch can heat up the second clutch instead of cooling it. Previous temperature modules have not been able to model or take into account these operating states.

According to a further advantageous embodiment it is proposed that the operating point parameter which is determined in step a) is at least one of the following parameters:
circumferential speed of a clutch disk,
relative circumferential speed of a clutch disk in relation to another clutch disk,
change in circumferential speed of a clutch disk,
rotational speed of an input shaft or of an output shaft of the clutch,
difference in rotational speed between the input shaft and the output shaft of the clutch,
clutch pressure or contact pressure force acting between clutch disks,
clutch torque,
sump temperature,
volume flow of the medium through the clutch, in particular in the case of active lubrication with oil or wetting.

In step a) a multiplicity of the parameters specified above can be accessed, in particular 3, 4, 5 or even all of them. The at least one operating point parameter which is determined in step a) is most particularly preferably a sump temperature and/or a rotational speed of an input shaft and/or of an output shaft of the clutch and/or a contact pressure force.

An operating point parameter can be, in particular, a speed with which the inner clutch disks or the outer clutch disks rotate. The wetting of the clutch disks with the medium is (directly) dependent on the rotational speed or the rate of rotation of the clutch disks. This is the case e.g. when the medium is fed through a duct and/or a cascade to an internal disk carrier via a crown gear or differential, and the medium is distributed on the basis of centrifugal forces via the clutch disks or by means of the clutch disks in a (radially) outward direction. In this context it is to be noted that the clutch can comprise e.g. inner clutch disks which are secured to an internal disk carrier and outer clutch disks which are secured to an external disk carrier, which outer and inner clutch disks together form at least one disk pack. The outer clutch disks and the inner clutch disks can each rotate with a speed (circumferential speed), wherein the circumferential speeds of these clutch disks can be different, with the result that differences in speed can result. This difference in speed between the inner clutch disks and the outer clutch disks can be taken into account as an operating parameter. Changes in circumferential speed of the clutch disks can result from acceleration processes and braking processes and can be taken into account as operating parameters. Rotational speeds of input shafts and output shafts are operational parameters which are usually proportional to circumferential speeds of the clutch disks and which can be used (alternatively).

The circumferential speed of the at least one clutch disk is preferred as an operating point parameter, in particular if the circumferential speed acts (directly) on the wetting of the clutch disk with the medium. This can be achieved by means of a feed device which feeds the medium to an (internal or external) disk carrier, in particular via or through a duct and/or a cascade, wherein the feed rate of the feed device is dependent on the circumferential speed or the rotational speed of the clutch disk. A feed device can comprise at least one pump, one line system, at least one duct, at least one crown gear, and at least one valve or the like.

The medium which is supplied in the sump can be fed by means of a (mechanical) feed device, in particular via a crown gear (as a function of the operating point or rotational speed). The feed rate and therefore the wetting generally depend decisively on the feed speed of the feed device for the medium, in particular on the rotational speed of the crown gear. For example, the feed device (crown gear) can be at least indirectly operatively connected to a shaft, e.g. drive shaft or input shaft or pinion shaft or output shaft of the clutch, wherein the rotational speed or feed speed of the feed device then depends directly on the rotational speed of this shaft. The sump temperature as an operating point parameter can be measured, for example, by means of a temperature sensor and/or calculated in a preceding iteration step. The volume flow of the medium through the clutch can serve as an operating point parameter in particular when what is referred to as active lubrication with oil or wetting of the clutch disks is provided. Active lubrication with oil or wetting is generally implemented with a feed pump which (actively) inputs the medium into the clutch. In particular, the feed pump feeds the medium from the sump and into the clutch here. Distribution of the medium within the clutch (via the clutch disks) can take place by means of centrifugal forces.

At least one of the clutch disks can be formed with at least one groove on at least one friction face, with the result that the medium can still distribute between the clutch disks even in the case of a completely closed clutch. In particular, all the friction faces of adjacent clutch disks which face one another are embodied with a multiplicity of essentially radially extending grooves.

A further group of operating point parameters are the coupling pressure and the coupling torque which are representative, respectively, alone or in combination with one another, of the forces transmitting by the clutch and which can have an influence, for example, on which shearing forces act on the medium, with the result that a film of the medium is interrupted at the faces which are wetted.

According to step b), at least one thermal property parameter is determined which is assigned to the medium as a function of the determined operating point parameter. At least one thermal property parameter of the medium can be determined or calculated (as a function of the determined operating point parameter). The at least one thermal property parameter of the medium can be determined from at least one characteristic diagram as a function of the determined operating point parameter. The at least one thermal property parameter of the medium can be calculated as a function of the determined operating point parameter.

According to one advantageous embodiment it is possible that the thermal property parameter of the medium, calculated in step b), is at least one of the following parameters:
  filling volume of the medium in the clutch,
  volume flow of the medium through the clutch,
  wetting of the clutch disk with the medium,
  viscosity of the medium in the clutch,
  thermal capacity of the medium in the clutch, and
  coefficient of heat transfer of the medium to a clutch component.

The temperature of the medium itself is accordingly not understood here to be a thermal property parameter of the medium.

The wetting or the degree of wetting of the clutch disk with the medium can rise owing to an increased rotational speed or circumferential speed of the clutch disk. This is the case, e.g., if the feed rate by means of which the medium is fed into the clutch is dependent on the rotational speed. The wetting of the clutch is accordingly a possible thermal property parameter. Moreover, the volume flow through the clutch also depends on the rotational speed or the circumferential speed of the clutch disk. Therefore, the volume flow is such a thermal property parameter. The volume flow also changes the filling volume of the medium in the clutch. The filling volume is accordingly a further property parameter. For example, the filling volume in the clutch can be integrated as a function of an inflow and/or outflow of the medium into the clutch or out of the clutch and/or out of the sump or into the sump. The volume of the medium in the sump should not be considered here to be part of the filling volume of the medium in the clutch. It is to be noted that the volume flow of the medium through the clutch in step b) should not even be calculated if it has already been used in step a) as an operating point parameter. In this context it is to be borne in mind that the volume flow of the medium through the clutch is to be used only in the case of active feeding of the medium as an operating point parameter. However, if said volume flow is not used as an operating point parameter, it can be calculated in step b) as a thermal property parameter of the medium.

The viscosity of the medium is a thermal property parameter because it can depend on the acting shearing forces on the medium, wherein the acting shearing forces generally also have a dependence on the circumferential speeds and rotational speeds from step a) as an operating point parameter from step a). Furthermore, the thermal capacitance of the medium and/or one or more coefficients of heat transfer of the medium to further clutch components can be considered as thermal property parameters. The thermal capacity depends, for example, on the filling volume of the medium and therefore also on the operating point parameters. The coefficients of heat transfer in turn have a dependence which varies, for example, over a degree of wetting of a surface of the clutch component with the medium and/or over a flow rate of the medium (along the surface of the clutch component) and/or over a viscosity of the medium.

According to the disclosed method, a plurality of thermal property parameters of the medium can also be determined, in particular calculated. In this context, the thermal property parameters can be dependent on one another or build on one another.

According to one advantageous embodiment it is possible that the thermal property parameter, determined in step c), of the clutch component is at least one of the following parameters:
  thermal mass of the clutch component,
  thermal capacity of the clutch component,
  coefficient of heat transfer between the clutch component and the medium, wherein the coefficient of heat transfer is calculated as a function of the operating point parameter, and
  coefficient of heat transfer to a further clutch component.

The component temperature of the respective clutch component itself is accordingly not understood here to be a thermal property parameter of the clutch component.

The thermal capacitance or the thermal mass of the clutch component and/or the coefficient of heat transfer to a further clutch component can be measured, for example, in test devices (in advance), or on the basis of the material data or selection of material and the geometric dimensions of the clutch component/components, wherein the latter are made available from a memory or characteristic diagram. In step c), the thermal mass or the thermal capacitance of the clutch component and/or the coefficient of heat transfer to a further clutch component can thus be determined or read from the memory or characteristic diagram. According to the present method, the coefficient of heat transfer between the clutch component and the medium can also be considered to be a thermal property parameter which is associated with the clutch component. However, this coefficient of heat transfer should not (have to) be calculated newly in step c) if it has already been calculated beforehand in step b) and is still current or valid for this iteration step.

According to one advantageous embodiment it is possible that the clutch component is at least one of the following components: a clutch disk, disk carrier, sump, or clutch housing.

According to one advantageous embodiment it is proposed that in step d) the calculation of at least one component temperature is also carried out as a function of at least one component temperature, determined in a preceding iteration step, of the same component and/or of another component. An iterative procedure permits, in particular, changes in the thermal energy in the clutch assembly to be effectively taken into account. The corresponding sequencing of the method can be explained, for example, on the basis of the following formula which represents a development or embodiment of the schematic formulas explained above:

$$T_K = T_{K-1} + \Delta T(E_K, E_M, T_{WK}, T_M)$$

$$T_K = T_{WK-1} + \Delta T(E_K, E_M, T_{WK}, T_M)$$

Here, $T_{K-1}$ is a temperature of the component from a preceding method iteration step. $T_{WK-1}$ is the temperature of a further component from a preceding method iteration step. First initialization with the values $T_K$ or $T_{WK}$ in the first method iteration (or cycle) can take place, for example, with ambient temperature values.

According to one advantageous embodiment it is possible that, before the steps d) and D) (if step D) is to be carried out), a sump temperature of a sump of the clutch is determined, and this sump temperature is additionally taken into account in steps d) and D) in order to calculate the component temperature and the medium temperature (if the medium temperature is calculated according to step D).

The sump temperature is an additional influencing value which can be taken into account in order to determine the component temperature or the temperature of the medium which is to be determined. This value could be taken into account, for example, on the basis of the following supplement to the already known formula above, wherein $T_S$ is the sump temperature.

$$T_K = T_{WK} + \Delta T(E_K, E_M, T_{WK}, T_M, T_S)$$

If a plurality of clutches are provided in one vehicle, the method which is described here can be executed separately for each of these clutches or for only some of these clutches. If, for example, two clutches are arranged one next to the other or one behind the other in a drive train, two temperature models, each according to the method proposed here, can be executed in order to calculate the operating-point-specific disk temperatures of the clutches on a common control unit or on separate control units.

According to a further aspect, a vehicle is also proposed having a clutch assembly for variably distributing torque to different axles of the vehicle, wherein the clutch assembly is assigned an electronic control unit which is suitable and configured to carry out a method according to one of the patent claims submitted herewith. For this purpose, the electronic control unit can comprise a program-controlled microprocessor and an electronic memory in which a corresponding control program or computer program is stored. The electronic control unit, in particular the control program or computer program, is configured and intended to execute all the steps of the method proposed here when it runs on the microprocessor.

The clutch assembly generally comprises a clutch, in particular disk clutch, having at least one disk pack as a clutch component, as well as at least one externally controllable activation unit for activating or deactivating the transmission of torque. The activation unit can comprise an electronic actuation device, in particular an electrical servomotor or a hydraulic actuator. The disk pack can usually be compressed by means of the electric actuation device or the hydraulic actuator, in order to initiate transmission of torque. The activation unit is generally controlled by the electronic control unit which correspondingly outputs electrical control currents to the activation unit via corresponding activation lines.

The clutch assembly proposed here serves preferably to perform demand-oriented distribution of torque to different axles of the vehicle, wherein during operation a (variable) differential rotational speed can be present continuously in the clutch, as a result of which the clutch is heated during the (entire) operation. Correspondingly, the clutch is cooled here by means of the medium (e.g., oil) during the entire operation, and the exchange of heat between the at least one clutch component and the medium is calculated continuously. Continuous monitoring of the temperature with the iterative method (i.e., of cycling through steps as disclosed herein) proposed here is therefore particularly advantageous.

The details, features and advantageous embodiments which are explained above in conjunction with the method can correspondingly also occur with the vehicle proposed here, and vice versa. In this respect, reference is made to the entire scope of the statements there relating to the more detailed characterization of the features.

SUMMARY OF THE DRAWINGS

Further explanation is provided in more detail below with reference to the figures. It is to be noted that the invention is not intended to be restricted by the exemplary embodiments shown. In particular, unless explicitly stated otherwise, it is also possible to extract partial aspects of the substantive matters explained in the figures and combine them with other components and realizations from the present description. In the drawings, in each case in a schematic form.

DESCRIPTION

Figure 1:
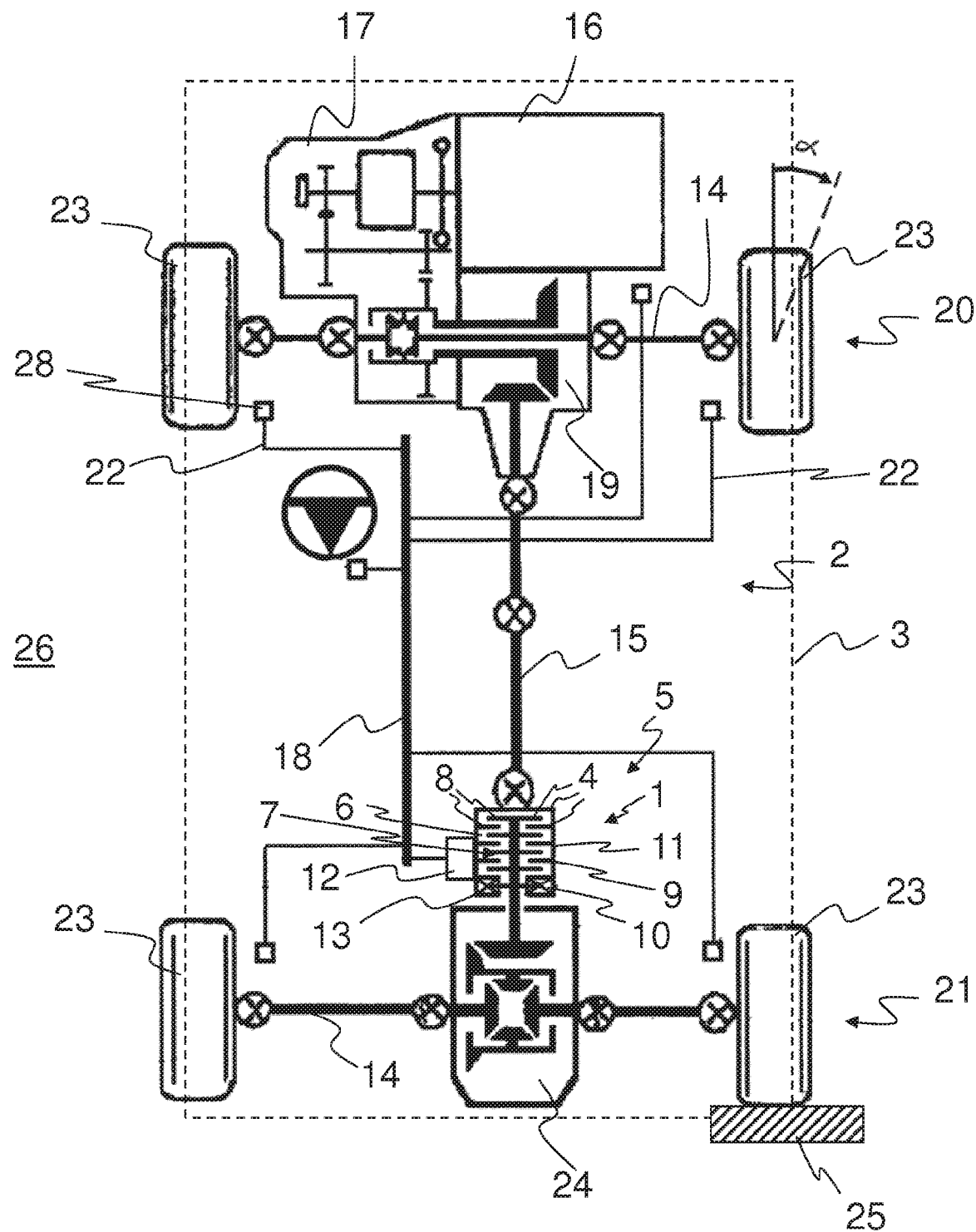
FIG. 1: shows a vehicle with a clutch assembly for variably distributing torque to different axles of the vehicle, which vehicle is suitable and configured to carry out the method explained here.

FIG. 1 shows schematically the design of a vehicle 3, with respect to the components which are decisive for the operation of the drive train 2. The vehicle 3 has an engine or motor 16 (operated with fuel and/or electrically), to which a transmission 17 is directly assigned. Arranged downstream of the transmission 17 is a transfer case 19, which apportions the drive torque from the transmission 17 to a front primary axle 20 and a rear secondary axle 21 of the vehicle 3 in a predetermined symmetrical or asymmetrical ratio. The drive torque is in this way transmitted to the wheels 23 of the vehicle 3 via the side shafts 14, or the longitudinal shaft 15.

Furthermore, a clutch assembly 5 with a clutch 1, here of the type of a multi-disk clutch, is provided, which is arranged, for example, upstream of a rear differential gear 24. The clutch 1 is connected to an externally controllable activation unit 13 for activation or deactivation, as a result of which a clutch assembly 5 is formed. Of course, the clutch assembly 5 can also be arranged at a different location within the drive train, for example at the front at the connection, or integrated into the distributed gear 19. The activation unit 13 is controlled by an electronic control unit 12 (ECU) which is mounted here, for example, directly on the clutch housing 11. The electronic control unit 12 correspondingly outputs electrical control currents to the activation unit 13 via corresponding activation lines. In the case of hydraulic activation of the clutch 1, the activation unit 13 can comprise a pump and/or valve arrangement. In the case of an electronically activated clutch 1, the activation unit 13 can comprise an electronic regulator such as, e.g., an electric motor. In both cases, the activation gives rise to an increased or decreased transmission of torque, owing to a greater or lesser degree of compression of the disk pack in the (multi-disk) clutch 1.

In order to transmit electrical signals from and to the control unit 12, a serial BUS arrangement 18 is provided which can be embodied, for example, as a CAN (controller area network) BUS. Interfaces, protocols and electrical circuitry for the transmission of signals onto a CAN-BUS are known and do not have to be explained here in more detail. The electronic control unit 12 comprises a program-controlled microprocessor and an electronic memory in which a control program is stored. In this context, corresponding control signals for the activation unit 13 are generated by the microprocessor in accordance with a control program. In order to generate corresponding control signals, the control unit 12 relies on information about various operating parameters of the vehicle 3. For this purpose, the control unit 12 can, via the BUS arrangement 18, access various signals which are representative of these operating parameters. In particular, wheel sensors 28 are provided for a (typically for each) wheel 23, and steering sensors are provided for detecting a steering angle of the vehicle and connecting it (via signal conductors 22) to the control unit 12 via the BUS arrangement 18. For example, a friction value (coefficient of friction) between the wheel 23 and the underlying surface 25 can be determined by means of the wheel sensors 28 and passed on to a superordinate vehicle movement dynamics system and/or the control unit 12.

FIG. 1 shows the clutch 1 as a multi-disk clutch for demand-oriented distribution of torque to a front axle 20 and/or rear axle 21. The clutch 1 is therefore used, in particular, in all-wheel-drive vehicles in which either the rear axle or the front axle can be activated (in a demand-oriented fashion) by means of an electronically regulated clutch assembly 5. The clutch 1 of the clutch assembly 5 therefore forms an electronically controlled multi-disk clutch of a demand-oriented all-wheel-drive system.

The clutch 1 comprises a multiplicity of clutch components 4, specifically clutch disks 8, disk carriers 9, at least one sump 10, and a clutch housing 11. Of course, the clutch 1 is constructed with internal disks 8 and external disks 8, wherein the internal disks 8 are secured or mounted on an internal disk carrier (without a reference symbol here) and the external disks 8 are secured or mounted on an external disk carrier 9. The clutch disks 8 move in a medium 6 for the purpose of cooling. Oil is used in this example as the medium 6. The medium 6 is stored here, for example, in a sump 10 within the clutch housing 11.

The clutch disks 8 are formed as friction disk pairs which are assigned to one another. Here, in each case one internal disk and one external disk rub against one another, owing to differences in rotational speed between the input shaft and the output shaft. The drive-side input shaft is connected here to the external disk carrier, and the output shaft to the internal disk carrier. Owing to the difference in rotational speed and the transmitted torque, friction power 7 is generated in the clutch 1, which friction power 7 causes heat to be generated in the clutch 1. The generated heat must be discharged from the clutch 1 again, which is usually done by means of the medium 6, stored in the sump 10, and the surroundings 26. The transfer of heat which is relevant here can occur through thermal conduction, convection and/or thermal radiation. However, heat is not generated only owing to the friction of the clutch disks 8 but also by the heating of the electronic control unit 12 which is customary during operation. Since the control unit 12 is mounted here directly on the clutch housing 11, and is therefore connected in a thermally conductive fashion to the clutch 1, the heating of the control unit 12 also influences the generation of heat in the clutch 1. The control unit 12 is cooled here decisively by convection owing to the ambient air flowing along it.

The electronic control unit 12 comprises a program-controlled microprocessor and an electronic memory in which a control program or computer program is stored. The computer program is configured and intended to execute all the steps of the method proposed here when it runs on the microprocessor.

Figure 2:
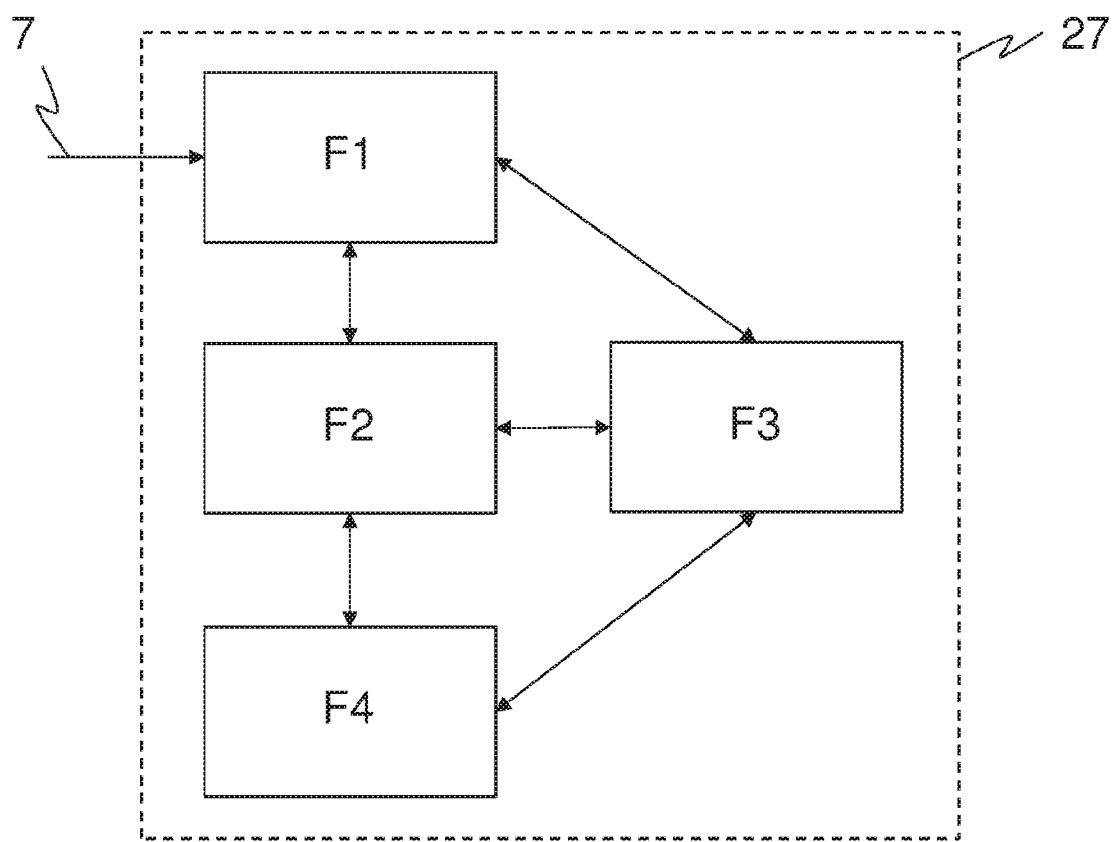
FIG. 2: shows a model diagram illustrating an example of the method.

FIG. 2 shows schematically a model image illustrating an embodiment of the method disclosed herein. The method disclosed herein serves to estimate, in an operating-point-specific fashion, the current disk temperature of the clutch disks 8 in a dynamic temperature model 27 or temperature algorithm. FIG. 2 shows the individual components provided within the temperature model. The illustration in FIG. 2 is therefore not oriented toward the individual method steps a) to e) but rather instead clarifies which possibilities the sequencing of the method according to steps a) to e) offers for the model-like simulation of a clutch assembly.

According to the illustration in FIG. 2, initially a simplified temperature model 27 is shown, wherein here three temperatures, specifically a disk temperature as a component temperature in the functional field F1, a disk carrier temperature as a component temperature in the functional field F2, and a temperature of the medium—of the medium 6 which is present in the region of the clutch disks 8 at the current operating point—in the functional field F3 are estimated or calculated. The functional fields F1 and F2 therefore correspond to the method step d). The functional field F3 corresponds to the method step D). In this context, the method steps a) to c) which are arranged upstream in FIG. 2 are not illustrated separately but rather illustrate upstream processing steps for these functional fields. In the functional field F4, a sump temperature is made available, which occurs in the case of the simplified temperature model 27 according to FIG. 2 by means of (current) measurements of this temperature, for example by means of a temperature sensor which is integrated into the sump 10.

Firstly, in the temperature model 27 at least one operating point parameter which is representative of a current operating state of the clutch 1 is determined. This corresponds to step a) and takes place in at least one of the abovementioned functional fields. The rotational speed or the circumferential speed of the external disk carrier serve as the operating point parameters here. The rotational speed of the external disk carrier corresponds essentially to the rotational speed of the drive-side input shaft whose current operating data is passed onto the control unit 12 by means of the BUS arrangement 18 and which is therefore available as input variables to the temperature model 27. The current circumferential speed of the external disk carrier can then be calculated by means of geometric operations, e.g., as a function of the radius of the external disk carrier. In this context, dynamic influences such as, e.g., torsion effects and/or elasticity of the drive train can also be taken into account.

In the same way, information or data relating to the difference in rotational speed which is currently present at the clutch 1 is also made available. The torque (clutch torque) which is transmitted at the respective operating point is determined here from multi-dimensional characteristic diagrams which are determined empirically (are dependent on the temperature and difference in rotational speed) and which describe which torque is transmitted at which coupling pressure. The current frictional power 7, which also serves as an input variable for the temperature model 27, can be calculated herefrom. A measured temperature, for example a measured sump temperature, can be taken into account as an input variable.

The current or operating-point-specific disk temperature of the clutch disks 8 is calculated in the functional field F1. Here, the mechanical power, specifically the frictional power 7 explained above, is taken into account as the input variable. The heat which is generated owing to the frictional power 7 increases the disk temperature as a function of the thermal capacitance of the clutch disks 8.

The coefficient of heat transfer between the clutch disks 8 and the medium is determined or calculated in an operating-point-specific fashion in the functional field F1. The coefficient of heat transfer between the clutch disks 8 and the medium 6 is understood here to be a thermal property parameter, according to method step (c), which is assigned to the clutch disks 8. For an explanation of the operating-point-specific calculation of the coefficient of heat transfer, reference is made to the following statements in this regard in relation to the medium 6. However, the coefficient of heat transfer does not have to be calculated newly in the functional field F1, it can also be determined, e.g., by retrieving it from the functional field F3. In parallel or in accordance with step c), the method step b) for determining the property parameters of the medium also occurs in the functional fields F1, F2, F3, etc.

A transfer of heat or energy transfer (mainly by thermal conduction) between the clutch disks 8 and the disk carrier 9 takes place as a function of the coefficient of heat transfer between the clutch disks 8 and the disk carrier 9, and the difference in temperature between the disk temperature and the disk carrier temperature. This is indicated in the temperature model 27 by means of a double arrow between the functional fields F1 and F2.

This transfer of heat gives rise in the functional field F1 to a change in the disk temperature as a function of the thermal capacitance of the clutch disks 8. This can be taken into account by means of the iterative configuration of the method described in that values (temperatures and/or method parameters) from a preceding iteration step are taken into account.

The heat transfer between the clutch disks 8 and the medium 6 which is in the clutch 1 and in the region of the clutch disks 8, that is to say "in the disk pack" at the respective operating point, is indicated by means of the double arrow between the functional fields F1 and F3. This heat transfer also gives rise to a change in the disk temperature in the functional field F1.

The disk carrier temperature of the disk carrier 9 is calculated in the functional field F2. Here, the heat transfer which has been explained above, between the clutch disks 8 and the disk carrier 9, is also taken into account. This heat transfer gives rise in the functional field F2 to a change in the disk carrier temperature, as a function of the thermal capacitance of the disk carrier.

In addition, the transfer of heat between the disk carrier 9 and the medium 6, which is currently located in the disk pack, is taken into account. This is illustrated in the temperature model 27 by means of the double arrow between the functional fields F2 and F3. This transfer of heat also gives rise in the functional field F2 to a change in the disk carrier temperature.

In addition, the coefficient of heat transfer between the disk carrier 9 and the medium 6 is determined or calculated in an operating-point-specific fashion in the functional field F2. The coefficient of heat transfer between the disk carrier 9 and the medium 6 is understood here to be a thermal property parameter, according to method step c), which is assigned to the disk carrier 9. For an explanation of the operating-point-specific calculation of the coefficient of heat transfer, reference is made to the following statements in this regard in relation to the medium 6. However, the coefficient of heat transfer does not have to be newly calculated in the functional field F2; it can also be determined, e.g., by retrieving it from the functional field F3.

Moreover, the disk carrier 9 also exchanges heat with the sump 10, which is illustrated here by the double arrow between the functional fields F2 and F4. The transfer of heat between the disk carrier 9 and the sump 10 can be calculated as a function of an operating-point-dependent coefficient of heat transfer and the temperature difference between the disk carrier temperature and the sump temperature, which gives rise to a change in the disk carrier temperature here, as a function of the thermal capacitance of the disk carrier 9, e.g., in a subsequent iteration step. The sump temperature is measured here and stored as an input variable in the functional field F4.

In the functional field F3, the current temperature of the medium 6 (e.g., oil), which is located in the clutch and in the region of the clutch disk 8, that is to say "in the clutch pack", can be calculated in an operating-point-specific fashion (and not measured). It is apparent from the illustration according to FIG. 2 that the temperature of the medium is influenced by all the clutch components, specifically the clutch disks 8 (functional field F1), the disk carrier 9 (functional field F2), and the sump 10 (functional field F4), and the respective temperatures thereof are also influenced in accordance with the thermal interaction.

In the functional field F3, according to the method step b), firstly at least one thermal property parameter, which is assigned to the medium, is calculated as a function of the determined operating point parameter by means of the operating point parameters which have been (previously) determined, specifically the rotational speed and/or the circumferential speed of the external disk carrier. For example, the volume of the medium which is currently located in the disk pack is calculated. This volume can be calculated as a function of the determined operating point parameters. The volume flow which is input into the clutch 1, in particular into the disk pack, is variable and depends on the rotational speed or the circumferential speed of the external disk carrier and on the sump temperature. In this context, the flow of medium can be conducted into the disk pack via or through a cascade. The sump temperature directly influences the viscosity of the medium. The volume flow of the medium 6 which exits the clutch 1, in particular the disk pack, also depends on the quantity or the volume of the medium which is currently located in the disk pack.

This dynamic calculation of the volume permits an operating-point-dependent calculation of the thermal capacitance or of the thermal mass of the medium 6 which is currently located in the clutch 1, in particular in the disk pack. The variable thermal capacitance of the medium, which decisively depends on the volume of medium currently present in the clutch 1, is therefore calculated in an operating-point-specific fashion in the functional field F3.

Moreover, the coefficient of heat transfer is also calculated in an operating-point-specific fashion in the functional field F3. The coefficient (a) of heat transfer between the medium 6 and one of the clutch components 4 is understood here to be a thermal property parameter, according to method step b), which is assigned to the medium 6. The coefficient of heat transfer depends, for example, on the sump temperature, because the latter influences the viscosity of the medium which enters the disk pack. In addition, the coefficient of heat transfer also depends on the speed of the medium, which is influenced by the rotational speed or the circumferential speed of the disk carrier.

Knowledge about the volume of medium which is currently located in the clutch or in the disk pack also makes it possible to calculate or estimate the wetting of the component surfaces. These wetted component surfaces represent here the thermal contact area or heat transfer area (A).

In the functional field F3, a heat transfer is calculated between the clutch disks 8 and the medium 6 as a function of the operating-point-dependent coefficient of heat transfer between the medium 6 and the clutch disks 8 and the temperature difference between the temperature of the medium and the disk temperature. This transfer of heat influences, in the functional field F3, the temperature of the medium of the medium 6 which is currently located in the disk pack, as a function of the operating-point-dependent thermal capacitance of the medium 6, e.g., for subsequent iteration steps.

In the functional field F3, a heat transfer is also calculated between the disk carrier 8 and the medium 6 as a function of the operating-point-dependent coefficient of heat transfer between the medium 6 and the disk carrier 9 and the temperature difference between the temperature of the medium and the disk carrier temperature. This transfer of heat influences, in the functional field F3, the temperature of the medium of the medium 6 which is currently located in the disk pack, as a function of the operating-point-dependent thermal capacitance of the medium 6, e.g., for subsequent iteration steps.

In a corresponding way, a transfer of heat between the medium 6 and the sump 10 can also be calculated. In addition, the sump 10 influences the temperature of the medium in that relatively cool medium 6 is input from the sump 10, in particular by means of a cascade, into the disk pack. Moreover, heated medium 6 is generally conducted back into the sump 10. These volume flows which enter or exit the disk pack also give rise to a change in the temperature of the medium.

Therefore, a method for operating a clutch assembly is specified which permits the operating-point-specific cooling behavior of the clutch disks to be taken into account. In addition, it is ensured that the temperature, which is currently present in the region of the clutch disks, of the (cooling) medium can be determined without having to rely for this on a temperature sensor for measuring the temperature of the (cooling) medium.

LIST OF REFERENCE NUMBERS

1 Clutch
2 Drive train
3 Vehicle
4 Clutch component
5 Clutch assembly
6 Medium
7 Friction power
8 Clutch disk
9 Disk carrier
10 Sump
11 Clutch housing
12 Control unit
13 Activation unit
14 Side shafts
15 Longitudinal shaft
16 Motor/engine
17 Transmission
18 BUS arrangement
19 Transfer case
20 Front axle
21 Rear axle
22 Signal conductor
23 Wheel
24 Differential gear
25 Underlying surface
26 Surroundings
27 Temperature model
28 Wheel sensor

The invention claimed is:

1. A method for operating a clutch assembly of a drive train of a vehicle, wherein the clutch assembly includes a clutch with at least one clutch component that exchanges heat at least indirectly with a medium which is conducted at least partially in the clutch, wherein the method comprises at least the following iteratively occurring steps:
   a) determining an operating point parameter which is representative of a current operating state of the clutch;
   b) determining a first thermal property parameter of the medium, as a function of the determined operating point parameter;
   c) determining a second thermal property parameter of the at least one clutch component;
   d) calculating a component temperature of the at least one clutch component as a function of at least the following three values: a further component temperature of a further clutch component, the first thermal property parameter, and the second thermal property parameter; and
   e) adapting activation of the clutch as a function of the calculated component temperature.

2. The method of claim 1, further comprising a step D) executed before step e), the step D) including:

D) calculating a medium temperature of the medium as a function of at least the following two values: the further component temperature of the further clutch component and the first thermal property parameter.

3. The method of claim 1, wherein the operating point parameter includes one or more of:
a circumferential speed of a clutch disk;
a relative circumferential speed of the clutch disk, in relation to another clutch disk;
a change in a circumferential speed of the clutch disk;
a rotational speed of an input shaft or of an output shaft of the clutch;
a difference in rotational speed between the input shaft and the output shaft of the clutch;
a clutch pressure or contact pressure force acting between clutch disks;
a clutch torque;
a sump temperature; and
a volume flow of the medium through the clutch.

4. The method of claim 1, wherein the first thermal property parameter includes one or more of:
a fill volume of the medium in the clutch;
a volume flow of the medium through the clutch;
a wetting of a clutch disk with the medium;
a viscosity of the medium in the clutch;
a thermal capacity of the medium in the clutch; and
a coefficient of heat transfer of the medium to the at least one clutch component.

5. The method of claim 1, wherein the second thermal property parameter includes one or more of:
a thermal mass of the at least one clutch component;
a thermal capacity of the at least one clutch component;
a coefficient of heat transfer between the at least one clutch component and the medium, wherein the coefficient of heat transfer is calculated as a function of the operating point parameter; and
a coefficient of heat transfer to the further clutch component.

6. The method of claim 1, wherein the at least one clutch component is at least one of:
a clutch disk;
a disk carrier;
a sump; and
a clutch housing.

7. The method of claim 1, wherein in step d) the calculation of the component temperature is further carried out as a function of at least one prior component temperature determined in a preceding iteration, the at least one prior component temperature relating to at least one of a same and a different component as the component temperature.

8. The method of claim 2, wherein, before the steps d) and D), a sump temperature of a sump of the clutch is determined, and the sump temperature is additionally taken into account in steps d) and D) to calculate a disk carrier temperature or the medium temperature.

9. An electronic control unit for a vehicle having a clutch assembly for variably distributing torque to different axles of the vehicle, wherein the clutch assembly includes a clutch with at least one clutch component, wherein the electronic control unit which is configured to carry out iteratively at least the following steps:
a) determining an operating point parameter which is representative of a current operating state of the clutch;
b) determining a first thermal property parameter of the medium, as a function of the determined operating point parameter;
c) determining a second thermal property parameter of the at least one clutch component;
d) calculating a component temperature of the at least one clutch component as a function of at least the following three values: a further component temperature of a further clutch component, the first thermal property parameter, and the second thermal property parameter; and
e) adapting activation of the clutch as a function of the calculated component temperature.

10. The electronic control unit of claim 9, further configured to carry out a step D) executed before step e), the step D) including:
D) calculating a medium temperature of the medium as a function of at least the following two values: the further component temperature of the further clutch component and the first thermal property parameter.

11. The electronic control unit of claim 9, wherein the operating point parameter includes one or more of:
a circumferential speed of a clutch disk;
a relative circumferential speed of the clutch disk, in relation to another clutch disk;
a change in a circumferential speed of the clutch disk;
a rotational speed of an input shaft or of an output shaft of the clutch;
a difference in rotational speed between the input shaft and the output shaft of the clutch;
a clutch pressure or contact pressure force acting between clutch disks;
a clutch torque;
a sump temperature; and
a volume flow of the medium through the clutch.

12. The electronic control unit of claim 9, wherein the first thermal property parameter includes one or more of:
a fill volume of the medium in the clutch;
a volume flow of the medium through the clutch;
a wetting of a clutch disk with the medium;
a viscosity of the medium in the clutch;
a thermal capacity of the medium in the clutch; and
a coefficient of heat transfer of the medium to the at least one clutch component.

13. The electronic control unit of claim 9, wherein the second thermal property parameter includes one or more of:
a thermal mass of the at least one clutch component;
a thermal capacity of the at least one clutch component;
a coefficient of heat transfer between the at least one clutch component and the medium, wherein the coefficient of heat transfer is calculated as a function of the operating point parameter; and
a coefficient of heat transfer to the further clutch component.

14. The electronic control unit of claim 9, wherein the at least one clutch component is at least one of:
a clutch disk;
a disk carrier;
a sump; and
a clutch housing.

15. The electronic control unit of claim 9, further configured so that, in step d), the calculation of the component temperature is further carried out as a function of at least one prior component temperature determined in a preceding iteration, the at least one prior component temperature relating to at least one of a same and a different component as the component temperature.

16. The electronic control unit of claim 10, further configured so that, before the steps d) and D), a sump temperature of a sump of the clutch is determined, and the sump temperature is additionally taken into account in steps d) and D) to calculate a disk carrier temperature or the medium temperature.

17. A vehicle having a clutch assembly for variably distributing torque to different axles of the vehicle, wherein the clutch assembly includes a clutch with at least one clutch component, the vehicle including an electronic control unit that is configured to carry out iteratively at least the following steps:
   a) determining an operating point parameter which is representative of a current operating state of the clutch;
   b) determining a first thermal property parameter of the medium, as a function of the determined operating point parameter;
   c) determining a second thermal property parameter of the at least one clutch component;
   d) calculating a component temperature of the at least one clutch component as a function of at least the following three values: a further component temperature of a further clutch component, the first thermal property parameter, and the second thermal property parameter; and
   e) adapting activation of the clutch as a function of the calculated component temperature.

18. The vehicle of claim 17, the electronic control unit further configured to carry out a step D) executed before step e), the step D) including:
   D) calculating a medium temperature of the medium as a function of at least the following two values: the further component temperature of the further clutch component and the first thermal property parameter.

* * * * *